United States Patent
Chen et al.

(10) Patent No.: US 9,311,268 B1
(45) Date of Patent: Apr. 12, 2016

(54) METHOD AND SYSTEM FOR COMMUNICATION WITH PERIPHERAL DEVICES

(71) Applicant: QLOGIC, Corporation, Aliso Viejo, CA (US)

(72) Inventors: Qian Chen, Irvine, CA (US); Ronald A. Weimer, Laguna Hills, CA (US)

(73) Assignee: QLOGIC, Corporation, Aliso Viejo, CA (US)

(*) Notice: Subject to any disclaimer, the term of this patent is extended or adjusted under 35 U.S.C. 154(b) by 407 days.

(21) Appl. No.: 14/058,887

(22) Filed: Oct. 21, 2013

Related U.S. Application Data

(60) Provisional application No. 61/718,599, filed on Oct. 25, 2012.

(51) Int. Cl.
*G06F 11/00* (2006.01)
*G06F 13/42* (2006.01)
*H04L 1/00* (2006.01)

(52) U.S. Cl.
CPC .......... *G06F 13/4282* (2013.01); *G06F 11/008* (2013.01); *H04L 1/0041* (2013.01)

(58) Field of Classification Search
CPC . G06F 13/4282; G06F 13/4286; G06F 13/36; H04L 1/004; H04L 1/0041; H04L 1/0072
See application file for complete search history.

(56) References Cited

U.S. PATENT DOCUMENTS

| | | | | |
|---|---|---|---|---|
| 6,691,192 | B2 * | 2/2004 | Ajanovic | G06F 13/124 370/468 |
| 7,010,607 | B1 * | 3/2006 | Bunton | H04L 1/24 709/228 |
| 2003/0131179 | A1 * | 7/2003 | Ajanovic | G06F 13/362 710/316 |
| 2009/0323722 | A1 * | 12/2009 | Sharma | G06F 13/4286 370/470 |
| 2012/0317607 | A1 * | 12/2012 | Wyatt | G09G 5/006 725/127 |
| 2013/0050216 | A1 * | 2/2013 | Whitby-Strevens | G06F 13/14 345/428 |

OTHER PUBLICATIONS

Boncelet, (The NTMAC for Authentication of Noisy Messages) Mar. 2006, IEEE Transactions on information forensics and security vol. 1 No. 1, p. 35-42.*
Haskell, (Resynchronization of Motion Compensated Video Affected by ATM Cell Loss), 1992, IEEE, p. 545-548.*
Chhaya, (Performance modeling of asynchronous data transfer methods of IEEE 802.11 MAC protocol*), 1997, Blatzer, Wireless Networks 3, p. 217-234.*
PCI Sig, (Errata for the PCI Express® Base Specification Revision 2.1) Nov. 2010, PCISIG, p. 1-76.*
Shah, (Keyboards and Covert Channels), Jun. 2006, Usenix, 15th Usenix Security Symposium (University of Pennsylvania), p. 59-75.*
"PCI Express Base Specification Revision 3.0", *PCI-SIG*, (Nov. 10, 2010).

* cited by examiner

*Primary Examiner* — Bryce Bonzo
*Assistant Examiner* — Jeison C Arcos
(74) *Attorney, Agent, or Firm* — Klein, O'Neill & Singh, LLP

(57) ABSTRACT

Methods and systems for ignoring protocol defined framing errors at a peripheral device coupled to a processor via an interconnect system are provided. When a framing error violation does not affect data transfer to the peripheral device or from the peripheral device, the protocol defined link training sequence is disabled to ignore the framing error and the peripheral device continues to process data regardless of the framing error.

20 Claims, 4 Drawing Sheets

METHOD AND SYSTEM FOR COMMUNICATION WITH PERIPHERAL DEVICES

CROSS-REFERENCE TO RELATED APPLICATIONS

This patent application claims the benefit under 35 U.S.C. §119(e) of U.S. Provisional Patent Application Ser. No. 61/718,599 filed on Oct. 25, 2012, the disclosure of which is incorporated herein in its entirety.

TECHNICAL FIELD

The present disclosure relates to computing systems and adapters.

BACKGROUND

Computing systems are commonly used today. A computing system often uses an adapter (or any network device) to send and receive information. Different protocols or interconnect types may be used to communicate with the adapters, for example, Peripheral Component Interface (PCI), PCI-Express (PCI-Express) and others. Often when traffic (or information, for example, frames, packets and others) received at an adapter has framing errors, then a link that connects the adapter with a computing system has to be "re-trained". The framing errors are often provided by the standard protocols used by the interconnect type (for example, PCI-Express) and the re-training may also be based on standard protocol procedures. When a link is being re-trained, then data transfer to and from the adapter stops. This results in a waste of bandwidth and thus a less efficient system. Continuous efforts are being made to improve communication with adapters.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

Figure 1A:
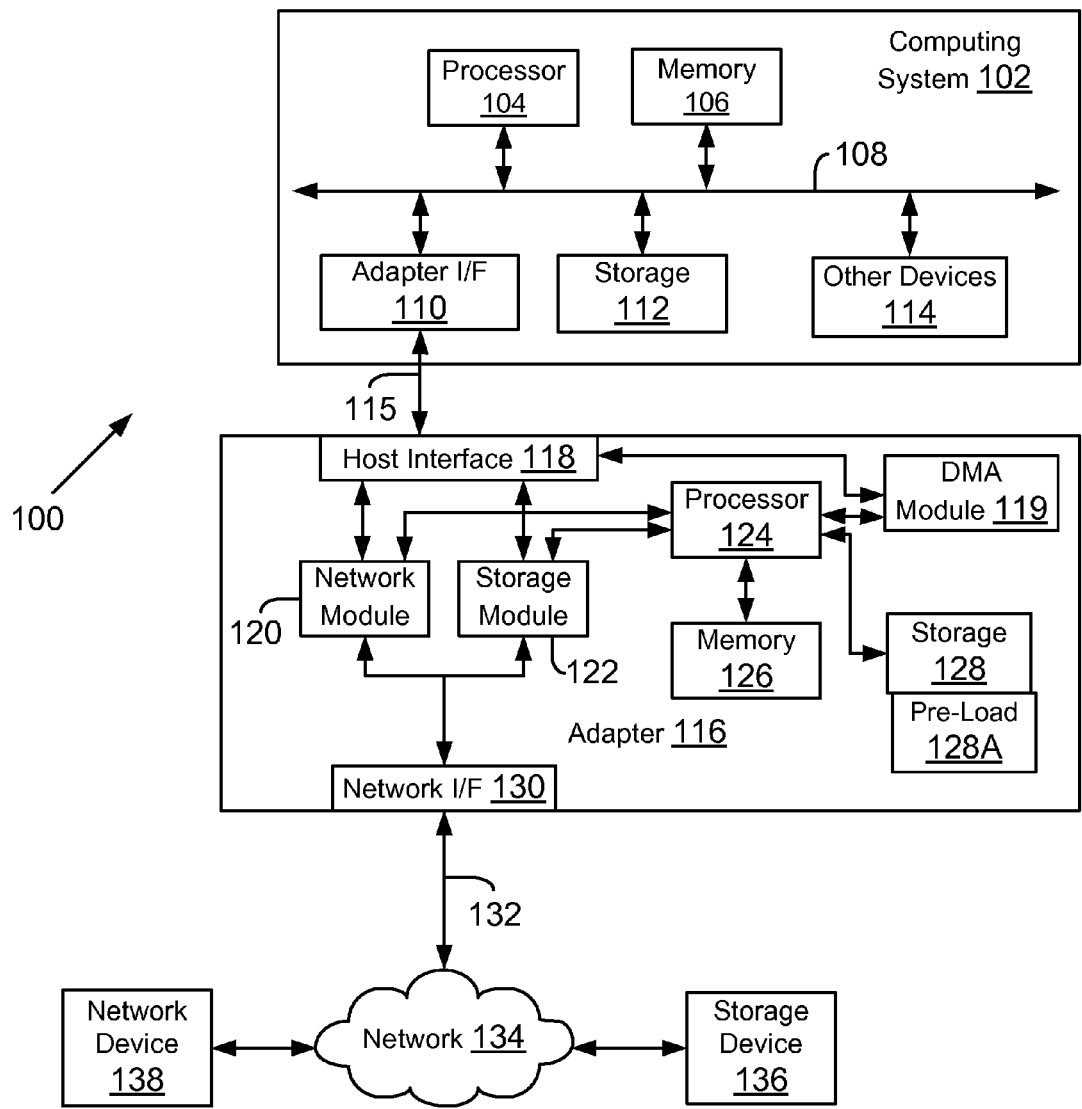
FIG. 1A is a functional block diagram of a computing system coupled to a network through an adapter.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry) or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

FIG. 1A is a block diagram of a system 100 configured for use with the present embodiments. The system 100 may include one or more computing system 102 (may also be referred to as "host system 102" or server 102) coupled to another device via a link 115, for example, an adapter 116 that interfaces with a network 134. The network 134 may include, for example, additional computing systems, servers, storage systems, etc. It is noteworthy that although the description below is based on the interaction between adapter 116 and host system 102, the embodiments disclosed herein are not limited to any particular adapter type or peripheral device type.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (or computer bus) 108. The computer bus 108 may be, for example, a system bus, a Peripheral Component Interconnect (PCI) bus (or PCI-Express (PCI-Express) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire®"), or any other interconnect type.

An adapter interface 110 interfaces with the adapter 116 via the link 115 for sending and receiving information. Link 115 may be an interconnect system, for example, a PCI-Express link and adapter interface 110 may be referred to as a "remote" PCI-Express device.

The computing system 102 also includes other devices and interfaces 114, which may include a display device interface, a keyboard interface, a pointing device interface, etc. Details regarding the other devices 114 are not germane to the embodiments disclosed herein.

The computing system 102 may further include a storage device 112, which may be for example a hard disk, a CD-ROM, a non-volatile memory device (flash or memory stick) or any other mass storage device. Storage device 112 may store operating system program files, application program files, and other files. Some of these files are stored on storage device 112 using an installation program. For example, the processor 104 may execute computer-executable process steps of an installation program so that the processor 104 can properly execute the application program.

Memory 106 also interfaces to the computer bus 108 to provide the processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple the adapter 116 to the computing system 102. The adapter 116 may be configured to handle both network and storage traffic. Various network and storage protocols may be used to handle network and storage traffic. Some of the common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates greater 100 Mbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via Host Bus Adapters or HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 116 shown in FIG. 1A may be configured to operate as an FCOE adapter and may be referred to as FCOE adapter 116. The illustrated adapter 116, however, does not limit the scope of the present embodiments. The present embodiments may be practiced with adapters having different configurations.

Referring back to FIG. 1A, adapter 116 interfaces with the computing system 102 via the link 115 and a host interface 118. In one embodiment, the host interface 118 may be referred to as a local PCI-Express device that includes a PCI Express interface with logic/circuitry for sending and receiving PCI-Express packets described below in detail.

The adapter 116 may also include a processor 124 that executes firmware instructions out of a memory 126 to control overall adapter operations. The adapter 116 may also include storage 128, which may be for example non-volatile memory, such as flash memory, or any other device. The storage 128 may store executable instructions and operating parameters that can be used for controlling adapter operations.

Storage 128 may also store a pre-load data structure 128A, according to one embodiment. The pre-load data structure 128A includes instructions for the adapter to ignore re-training of link 115, when certain framing errors occur. These framing errors are such that they do not disrupt I/O traffic.

The adapter 116 includes a network module 120 for handling network traffic via a link 132. In one embodiment, the network module 120 includes logic and circuitry for handling network packets, for example, Ethernet or any other type of network packets. The network module 120 may include memory buffers (not shown) to temporarily store information received from other network devices 138 and transmitted to other network devices 138.

The adapter 116 may also include a storage module 122 for handling storage traffic to and from storage devices 136. The storage module 122 may further include memory buffers (not shown) to temporarily store information received from the storage devices 136 and transmitted by the adapter 116 to the storage devices 136. In one embodiment, the storage module 122 is configured to process storage traffic according to the Fibre Channel storage protocol, or any other protocol. It is noteworthy that adapter 116 may be a converged network adapter having both network module 120 and storage module 122 or only having either a network module 120 or a storage module 122. The embodiments described herein are not limited to any particular adapter type.

The adapter 116 also includes a network interface 130 that interfaces with link 132 via one or more ports (not shown). The network interface 130 includes logic and circuitry to receive information via the network link 132 and pass it to either the network module 120 or the storage module 122, depending on the packet type.

Adapter 116 also includes a direct memory access (DMA) module 119 that is used to manage access to link 115. The DMA module 119 uses a plurality of DMA channels (168A-168N, FIG. 1C) for transferring data via link 115. The DMA channels are typically used to move control structures such as input/output control blocks (IOCBs), input/output status blocks (IOSBs) and data between host system memory 106 and the adapter memory 126.

Figure 1B:
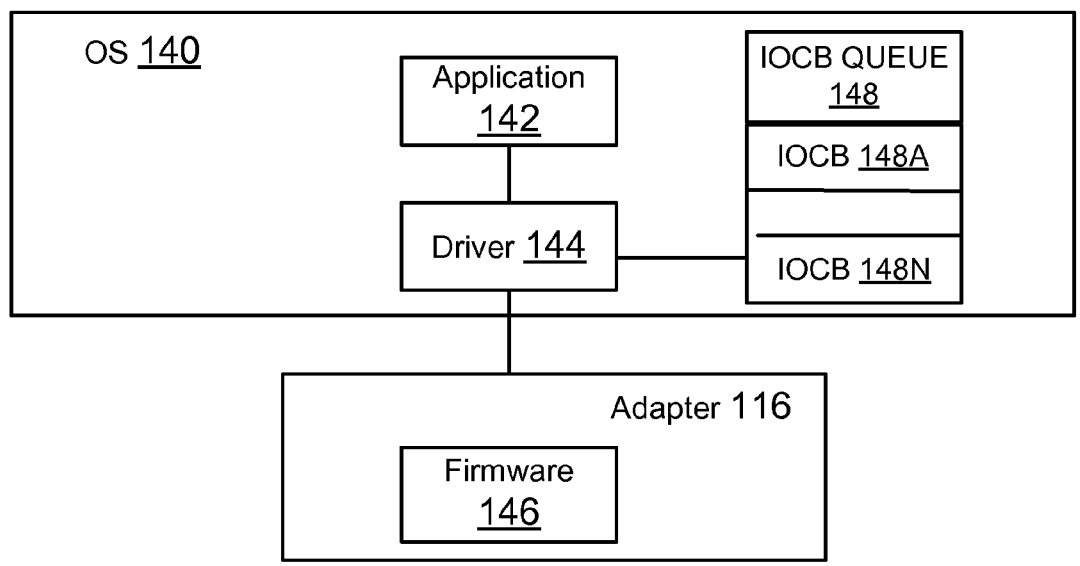
FIG. 1B shows a block diagram of a generic architecture used by the system of FIG. 1A.

FIG. 1B shows an example of a generic software architecture used by system 100. Processor 104 executes an operating system 140 for controlling the overall operations of computing system 102. The operating system may be Windows based, Linux operating system, Solaris, or any other operating system type. The embodiments disclosed herein are not limited to any particular operating system type.

An application 142 may be executed by processor 104 for performing certain functions. For example, application 142 may be an email program, a database application or any other application type. Application 142 may send a command to a driver 144 for performing an operation, for example, reading and/or writing data (input/output (I/O)) at another storage device. The driver 144 processes the request and communicates with firmware 146 executed by processor 124 of adapter 116. A component of adapter 116 then processes the request.

Typically for managing data transfers across link 115, the following process steps are typically used: an IOCB is first generated by the driver 144 and saved at an IOCB queue 148, shown as 148A-148N. The IOCB queue 148 may be at host memory 106 or any other location. The IOCB is obtained by adapter 116, the purpose of which may be to provide data to host processor 104 or to send data provided by host processor 104. For a write operation, an IOCB typically includes an "address" of host memory 106 where data that needs to be sent is stored and a "length" that indicates the amount of data that needs to be transferred. Both IOCB fetch and data transfer operations are performed using DMA operations via the DMA channels 168A-N. Based on the IOCB, adapter 116 executes the operations that may be needed.

Figure 1C:
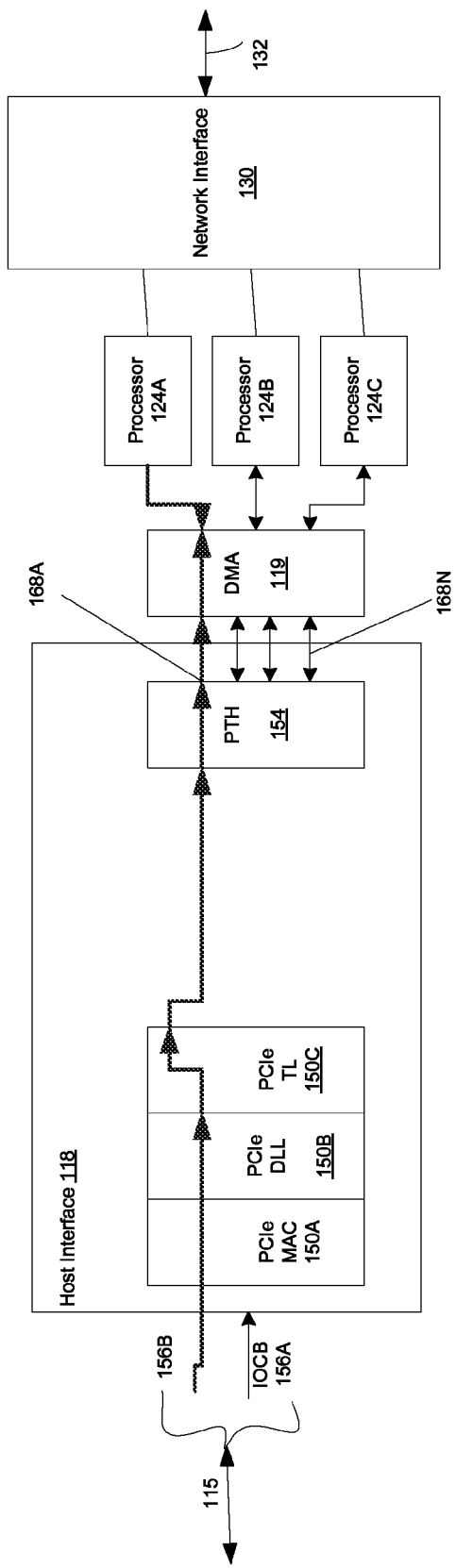
FIG. 1C shows an example of a system used for communication, according to one embodiment.

Adapter 116 then uses a DMA operation to send a status block (IOSB) to processor 104 indicating the completion of IOCB execution and associated data transfer. The adapter 116 then sends an interrupt message to the host processor 104 to indicate completion of IOCB execution and posting of the IOSB status in the host system memory 106 so that it can process IOSBs and notify application 142 of the completion of the data transfer process FIG. 1C illustrates details of host interface 118, according to one embodiment. Host interface 118 includes a plurality of modules which are configured to process PCI-Express packets. Host interface 118 may include a PCI-Express media access control (MAC) layer (also referred to as PHY or PHY layer) 150A for receiving and sending messages via link 115. Host interface 118 includes a PCI-Express data link layer (referred to as DLL) 150B between a PCI-Express transaction layer (referred to as TL) 150C and PHY 150A. PHY 150A, DLL 150B and TL 150C are defined by the PCI-Express specification.

Host interface 118 also includes a PCI-Express Transaction Handler (PTH) 154 that interfaces with the DMA module 119 and TL 150C to send and receive information via link 115. PTH 154 performs various functions including error checking and others.

PCI-Express uses a packet-based protocol to exchange information between TL 150A and a TL (not shown) at the adapter interface 110. Transactions are carried out using requests and completions. Completions are used only when required, for example, to return read data or to acknowledge completion of a request. On the transmit side (i.e. packets to processor 104 from adapter 116), packets flow from the TL 150C to PHY 150A. On the receive side (i.e. packets to adapter 116 from processor 104), packets are processed by the PHY layer 150A and sent to TL 150C for processing. TL 150C assembles and disassembles Transaction Layer Packets ("TLPs"). TLPs are used to communicate transactions, such as read and write and other type of events.

The system of FIG. 1C shows more than one processor 124 (labeled as 124A-124C) for adapter 116. The embodiments described herein are not limited to any particular number of processors. Processors 124A-124C interface with the DMA module 119 to send and receive data and messages via link 115.

As described above, driver 144 generates an IOCB for an I/O request to send data via network link 132 to a destination. The IOCB is placed at the IOCB queue 148. The IOCB (for example, 156A) is then received by adapter 116 and provided to one of the processors, for example, 124A. The processor 124A then programs a DMA channel (for example, 168A) to obtain data from host memory 106 via path 156B. Once data is received it is transmitted via the network interface 130 and network link 132 to its destination.

The PCI-Express Gen 3 (i.e. third generation) specification describes certain framing errors, which when detected may require a PCI-Express link to undergo a "re-training" sequence. The re-training sequence is also described by the PCI-Express standard specification. Re-training the link stops data transfer which slows down the bandwidth available to a PCI-Express link. In one embodiment, a method and system are provided where certain framing errors that don't affect data transfer are ignored. Adapter 116 may also ignore certain framing errors that it keeps detecting because of a link partner but the errors do not result in data corruption.

The following is an example of some PCI-Express framing requirements that are provided by Section 4.2.2.3.2 of the PCI-Express standard:

To Transmit a TLP (Transfer Layer Packet): Transmit an STP Token (a framing token that indicates the start of a TLP) immediately followed by a complete TLP information provided by the Data Link Layer. All DWs (data words) of a TLP, as specified by a TLP Length field of the STP Token, are to be transmitted, even if the TLP is nullified. If the TLP is nullified, an EDB Token (End bad symbol that marks the end of a nullified TLP) should be transmitted immediately following the TLP. There should be no Symbols between the last Symbol of the TLP and the first Symbol of the EDB Token. The value of the TLP Length field of a nullified TLP's STP Token is NOT adjusted to account for the EDB Token. The STP Token is not be transmitted more frequently than once per Symbol Time.

To Transmit a DLLP (data link layer packet): Transmit an SDP (session description protocol) Token (defined by PCI-Express as having two symbols) immediately followed by the complete DLLP information provided by the Data Link Layer. All 6 Symbols of the DLLP must be transmitted. The SDP Token must not be transmitted more frequently than once per Symbol Time. It is noteworthy that PCI-Express has other framing requirements in this section to end a data stream, as well as to transmit a SKP (SKIP) ordered set.

Figure 2:
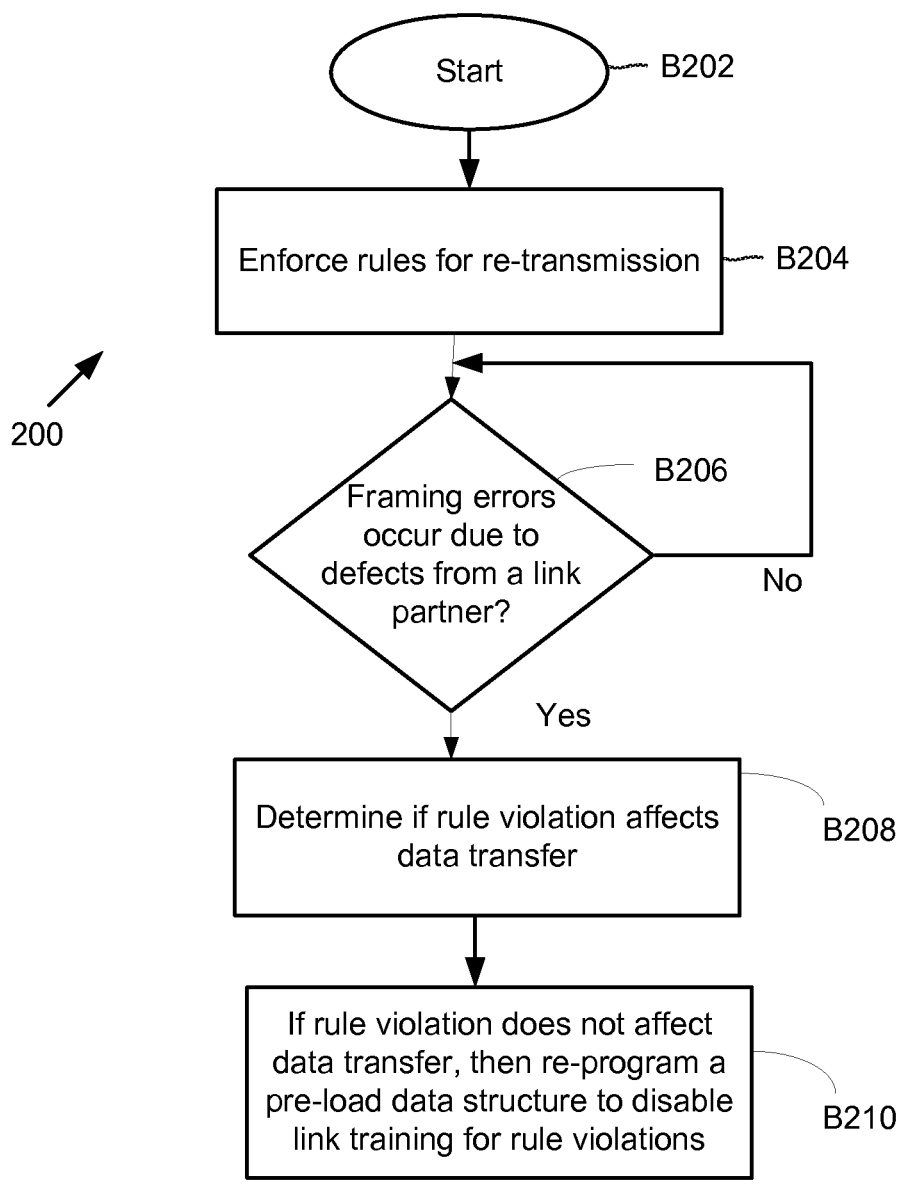
FIG. 2 shows a process according to one embodiment.

FIG. 2 shows a process 200 for managing framing errors, according to one embodiment. The process begins in block B200, when adapter 116 is initialized. In block B204, the standard PCI-Express rules for re-transmission are enforced for sending and receiving information to processor 104 via link 115. In block B206, based on received packets and while communicating with processor 104, the firmware 146 of adapter 116 determines if certain framing errors occur due to defects at a link partner. The term link partner as used herein means a device communicating with another device via a link. For example, adapter interface 110 and host interface 118 are link partners communicating via link 115. Without these instructions, link 115 will be re-trained even though the framing error is benign.

In block B208, the adapter firmware determines if the framing error violations based on standard protocol rules are benign or may result in data corruption. When the rule violation does not affect data transfer, in block B210, the pre-load data structure 128A is programmed to disable link training for those benign rule violations. The pre-load data structure 128A is used to store instructions for firmware 146 to instruct the host interface 118 to disable re-training of link 115. The re-training sequence is defined by the PCI-Express specification that is incorporated herein by reference. Thus, the pre-load data structure 128A allows adapter 116 to perform a task that is typically performed by most PCI-Express devices.

Thus an intelligent system for handling framing errors is provided where certain framing errors are ignored. Unnecessary link training is avoided and hence bandwidth is not wasted and the system operates more efficiently.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. For example, the embodiments disclosed herein are applicable to any peripheral device and are not limited to any particular adapter type. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented method for ignoring protocol defined framing error at a peripheral device coupled to a processor via an interconnect system, comprising:
   when a framing error violation does not affect data transfer to the peripheral device or from the peripheral device, disabling protocol defined link training sequence to ignore the framing error; and
   continue processing data by the peripheral device regardless of the framing error.

2. The method of claim 1, wherein the interconnect system is a PCI-Express link.

3. The method of claim 1, wherein the peripheral device is an adapter coupled to the processor via a PCI-Express link.

4. The method of claim 1, wherein the peripheral device is a network adapter.

5. The method of claim 1, wherein the peripheral device is a host bus adapter.

6. The method of claim 1, wherein the peripheral device is a converged network adapter that can process both storage and network traffic.

7. The method of claim 1, wherein the peripheral device detects the framing error and uses a pre-loaded data structure for instructions to ignore the framing error.

8. A machine implemented method for ignoring protocol defined framing error at a peripheral device coupled to a processor via an interconnect system, comprising:
   maintaining a data structure at a memory device for storing instructions to ignore a certain framing error violation that does not affect data transfer to the peripheral device or from the peripheral device;
   disabling a protocol defined link training sequence to ignore the framing error; and
   continue processing data by the peripheral device regardless of the framing error.

9. The method of claim 8, wherein the interconnect system is a PCI-Express link.

10. The method of claim 8, wherein the peripheral device is an adapter coupled to the processor via a PCI-Express link.

11. The method of claim 8, wherein the peripheral device is a network adapter.

12. The method of claim 8, wherein the peripheral device is a host bus adapter.

13. The method of claim 8, wherein the peripheral device is a converged network adapter that can process both storage and network traffic.

14. A peripheral device, comprising:
   a host interface communicating with a processor of a computing device via an interconnect system; and
   a memory device for storing instructions to ignore a framing error violation that does not affect data transfer to the peripheral device or from the peripheral device; disable a protocol defined link training sequence to ignore the framing error; and continue processing data regardless of the framing error.

15. The peripheral device of claim 14, wherein the interconnect system is a PCI-Express link.

16. The peripheral device of claim 14, wherein the peripheral device is an adapter coupled to the processor via a PCI-Express link.

17. The peripheral device of claim 14, wherein the peripheral device is a network adapter.

18. The peripheral device of claim 14, wherein the peripheral device is a host bus adapter.

19. The peripheral device of claim 14, wherein the peripheral device is a converged network adapter that can process both storage and network traffic.

20. The peripheral device of claim 14 wherein the instructions are stored in a pre-loaded data structure.

* * * * *